Jan. 16, 1923. 1,442,724

J. J. HOGAN.
PIPE AND FITTING JOINT.
FILED AUG. 31, 1920.

Inventor
Jay J. Hogan
By
Attorney.

Patented Jan. 16, 1923.

1,442,724

UNITED STATES PATENT OFFICE.

JAY J. HOGAN, OF ERIE, PENNSYLVANIA, ASSIGNOR TO HOGAN-SPENCER-WHITLEY COMPANY, OF ERIE, PENNSYLVANIA, A CORPORATION OF PENNSYLVANIA.

PIPE AND FITTING JOINT.

Application filed August 31, 1920. Serial No. 407,138.

*To all whom it may concern:*

Be it known that I, JAY J. HOGAN, a citizen of the United States, residing at Erie, in the county of Erie and State of Pennsylvania, have invented new and useful Improvements in a Pipe and Fitting Joint, of which the following is a specification.

The invention is particularly designed to unite a fitting with a pipe where the alinement of the pipe with the fitting is important and where it is desirable that the connection between the pipe and the fitting may be accomplished by slipping the pipe into place. The invention is particularly useful in uniting bearings and particularly where the pipe forms a housing for a shaft extending between the bearings and the invention is illustrated in this relation.

The invention is illustrated in the accompanying drawings as follows:—

Figure 1:
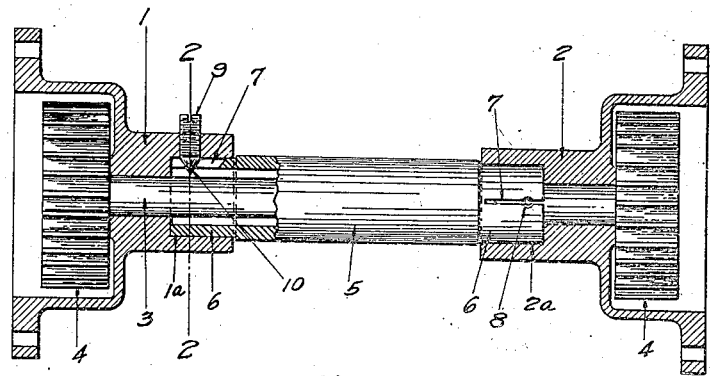

Fig. 1 shows a side elevation of the joint, partly in section.

Figures 2, 3:
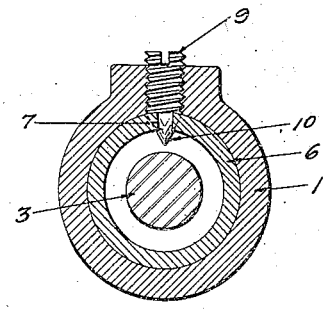

Fig. 2 a section on the line 2—2 in Fig. 1 with the pipe in place but not expanded.

Fig. 3 a similar section, slightly off-set, with the pipe expanded into place.

1 marks one fitting which is in the form of a housing and bearing, 2 a similar housing and bearing, 3 a shaft journaled in the bearings and 4 gears arranged on the shaft. These may be of any ordinary type. As shown they form a unit in a washing machine.

The connecting pipe and housing 5 has its ends turned at 6 and these ends have slits 7 extending inwardly from the ends and conical sockets 8 arranged in the pipe along the slits. The ends 6 extend into sockets 1ª and 2ª forming a sliding and comparatively loose fit.

Screws 9 extend through the walls of the sockets 1ª and 2ª. These screws have conical ends 10 which extend into the sockets or seats 8 and as the screw is forced forward the engaging surfaces of the end of the screw and the seat operate to spread the end of the pipe so as to expand it against the walls of the socket. It will be noted that with this construction the pipe forces the fittings into perfect alinement so that the bearings carrying the shaft are in alinement. The assembling may be done by slipping the fittings endwise and consequently if for any reason it is desired to detach the parts this can be done much more readily than where the parts are screwed together. The screw acting in the seat positively keys the pipe in place so that the pipe is not only clamped but locked against turning and disengagement.

What I claim as new is:—

1. The combination of a fitting having a socket; a pipe extending into the socket, said pipe having an axially extending slit severing the pipe along the slit; and a screw extending from the wall of the fitting into the slit, said screw and slit having engaging surfaces spreading the pipe against the walls of the socket as the screw is screwed inwardly.

2. The combination of a fitting having a socket; a pipe extending into the socket, said pipe having an axially extending slit severing the pipe along the slit; a conical screw seat along the slit; and a screw extending from the wall of the fitting into the slit and acting on the cone surfaces of the seat for expanding the pipe into engagement with the walls of the socket.

3. The combination of two fittings each having a pipe socket; a pipe extending between the fittings, the ends of the pipe extending into the sockets in the fittings and each end of the pipe having an axially extending slit severing the pipe along the slit; and a screw extending from the wall of each fitting into the slit, said screws and slits having engaging surfaces spreading the pipe against the walls of the sockets as the screws are screwed inwardly.

4. The combination of a fitting having a bearing therein; a shaft journaled in the bearing; a pipe extending into the socket forming a housing for the pipe, said pipe having an axially extending slit severing the pipe along the slit; and a screw extending from the walls of the fitting into the slit, said screw and slit having engaging surfaces spreading the pipe against the walls of the socket as the screw is screwed inwardly.

5. The combination of two fittings each having a bearing; and a pipe socket in alinement with the bearing; a shaft journaled in said bearings; a pipe extending between the fittings, the ends of the pipe extending into the sockets, each end of the pipe having an axially extending slit severing the pipe along the slit; and a screw extending from the wall of each socket into each slit, said screws and slits having engaging surfaces spreading the pipe against the walls of the sockets as the screws are screwed inwardly.

In testimony whereof I have hereunto set my hand.

JAY J. HOGAN.